United States Patent [19]
Weiser et al.

[11] Patent Number: 5,814,259
[45] Date of Patent: Sep. 29, 1998

[54] METHOD FOR MOLDING STRUCTURAL PARTS UTILIZING MODIFIED SILICONE RUBBER

[75] Inventors: Erik S. Weiser, Santa Maria, Calif.; Robert M. Baucom, Newport News; John J. Snoha, Hampton, both of Va.

[73] Assignee: The United States of America as represented by the United States National Aeronautics and Space Administration, Washington, D.C.

[21] Appl. No.: 824,097

[22] Filed: Mar. 25, 1997

Related U.S. Application Data

[63] Continuation of Ser. No. 292,621, Aug. 12, 1994, abandoned.

[51] Int. Cl.⁶ ................................................. B29C 43/10
[52] U.S. Cl. ........................ 264/219; 264/313; 264/320
[58] Field of Search .......................... 264/50, 313, 314, 264/45.2, 49, 219, 320

[56] References Cited

U.S. PATENT DOCUMENTS

| | | | |
|---|---|---|---|
| 2,297,022 | 9/1942 | Pfleumer | 264/313 |
| 2,458,864 | 1/1949 | Lindsay | 264/313 |
| 2,986,797 | 6/1961 | Aisenberg | 264/313 |
| 3,046,172 | 7/1962 | Reid | 264/49 |
| 4,167,430 | 9/1979 | Arachi | . |
| 4,501,482 | 2/1985 | Stryjewski | 29/132 |
| 4,624,820 | 11/1986 | Barraclough | . |
| 4,889,668 | 12/1989 | Kemp | . |
| 5,051,224 | 9/1991 | Donatelli et al. | 264/313 |
| 5,117,472 | 5/1992 | Blyler, Jr. et al. | 385/28 |
| 5,304,057 | 4/1994 | Celerier et al. | 425/389 |
| 5,314,654 | 5/1994 | Gunderson et al. | 264/120 |

FOREIGN PATENT DOCUMENTS

| | | | |
|---|---|---|---|
| 2691108 | 11/1993 | France | 264/313 |
| 2309187 | 8/1973 | Germany | 264/313 |
| 562996 | 9/1979 | U.S.S.R. | 264/313 |

*Primary Examiner*—Allan R. Kuhns
*Attorney, Agent, or Firm*—Kimberly A. Chasteen

[57] ABSTRACT

This invention improves upon a method for molding structural parts from preform material. Preform material to be used for the part is provided. A silicone rubber composition containing entrained air voids is prepared. The silicone rubber and preform material assembly is situated within a rigid mold cavity used to shape the preform material to the desired shape. The entire assembly is heated in a standard heating device so that the thermal expansion of the silicone rubber exerts the pressure necessary to force the preform material into contact with the mold container. The introduction of discrete air voids into the silicone rubber allows for accurately controlled pressure application on the preform material at the cure temperature.

8 Claims, 1 Drawing Sheet

METHOD FOR MOLDING STRUCTURAL PARTS UTILIZING MODIFIED SILICONE RUBBER

This is a continuation of application Ser. No. 08/292,621 filed on Aug. 12, 1994, now abandoned.

ORIGIN OF THE INVENTION

The invention described herein was made by employees of the United States Government and may be manufactured and used by the government for governmental purposes without the payment of any royalties thereon or therefore.

FIELD OF THE INVENTION

This invention relates generally to molding and particularly to a modified silicone rubber for applying precise pressure to preform materials at the cure temperatures.

DESCRIPTION OF THE RELATED ART

Control of the pressure at the cure temperature of polymer matrix composites is critical to the fabrication of high quality composite structures. Typically, composite structures are formed by laying up preform material over a mandrel or within a die and then subjecting the assembly to precise temperature and pressure conditions.

The application of pressure during the cure stage can be performed in various ways. An autoclave may be used to apply pressure, although the use of an autoclave can be expensive and complicated. A less expensive and simpler method utilizes silicone rubber to apply pressure to the preform material during the cure process. The thermal expansion of the silicone rubber during the cure stage applies the pressure necessary to force the preform layup into contact with the die. Silicone rubber has also been used in combination with an autoclave to assist in applying pressure to selected areas of a part in addition to the pressure supplied by the autoclave.

Prior art discloses the use of silicone rubber systems to apply pressure during the molding of structural parts. For example, Arachi (U.S. Pat. No. 4,167,430) utilized the expansion of standard silicone rubber to fabricate bonded composite structures, such as a missile fin. Due to the high expansion rate of silicone rubber in the "as received and cured" form, it is very difficult to maintain proper pressure application levels at the cure temperatures of composite materials. The problem of not managing the system's pressure generation frequently results in too much resin flow out due to excessive pressure.

Prior inventions disclose various methods employed to control the pressure of the expanding rubber. For example, Barraclough (U.S. Pat. No. 4,624,820) discloses an apparatus that employs hydraulic pressure, in addition to the pressure from the silicone rubber, to apply pressure during the initial stage of the curing process. As the silicone rubber expands, the hydraulic pressure is reduced in order to maintain the desired pressure. Kemp (U.S. Pat. No. 4,889,668) discloses a method that does not employ an external pressure source, but selectively heats and cools the rubber system to produce the desired amount of pressure.

The object of this invention is to modify the silicone rubber system so that the pressure exerted by the system can be controlled. This will allow for the desired pressure to be applied to the preform part at the cure temperature. This method allows for a relatively simple way to mold structural parts without the need for an expensive autoclave to obtain accurate pressure application.

SUMMARY OF THE INVENTION

In order to control the pressure applied to the preform material by the expanding silicone rubber during the curing process, a modified silicone rubber composition is prepared. This technology involves the introduction of discrete air voids into the silicone rubber composition during the preparation of the silicone rubber composition. The introduction of air voids into the silicone rubber results in a significant reduction in the bulk modulus of the rubber. The bulk modulus is the physical property of the rubber that defines the rate of pressure applied by the rubber to the preform material during thermal expansion.

The amount of pressure to be applied to the composite material during the cure process dictates the volume of silicone rubber to be used in relation to the volume of the rigid mold cavity. If it is calculated that a volume of silicone rubber equal to the volume of the mold cavity would result in excessive pressure application, the volume of the silicone rubber system is reduced so that free expansion can occur before the expansion forces the composite part into contact with the mold container. The necessary reduction in volume is dependent upon the bulk modulus of the rubber as well as the cure temperature and can be calculated using standard equations known to those skilled in the art.

This modification to a standard silicone rubber molding system results in a molding process that can be used to mold complex structural parts without the use of an autoclave and still maintain accurate pressure generation. As discussed below, the introduction of discrete air voids into the silicone rubber system can result in the reduction of the thermal expansion of a silicone rubber by a factor of ten. This allows for a very manageable 20 psi change in pressure applied to the preform material by the rubber for every 10° F., as compared to 200 psi for every 10° F. when the silicone rubber is not modified.

BRIEF DESCRIPTION OF THE FIGURE

For a more complete understanding of the present invention, including its primary object and benefits, reference should be made to the Description of the Preferred Embodiment below. This Description should be read together with the accompanying drawing, which is a plot of pressure versus temperature for various preparations of silicone rubber.

DESCRIPTION OF THE PREFERRED EMBODIMENT

Figure 1:
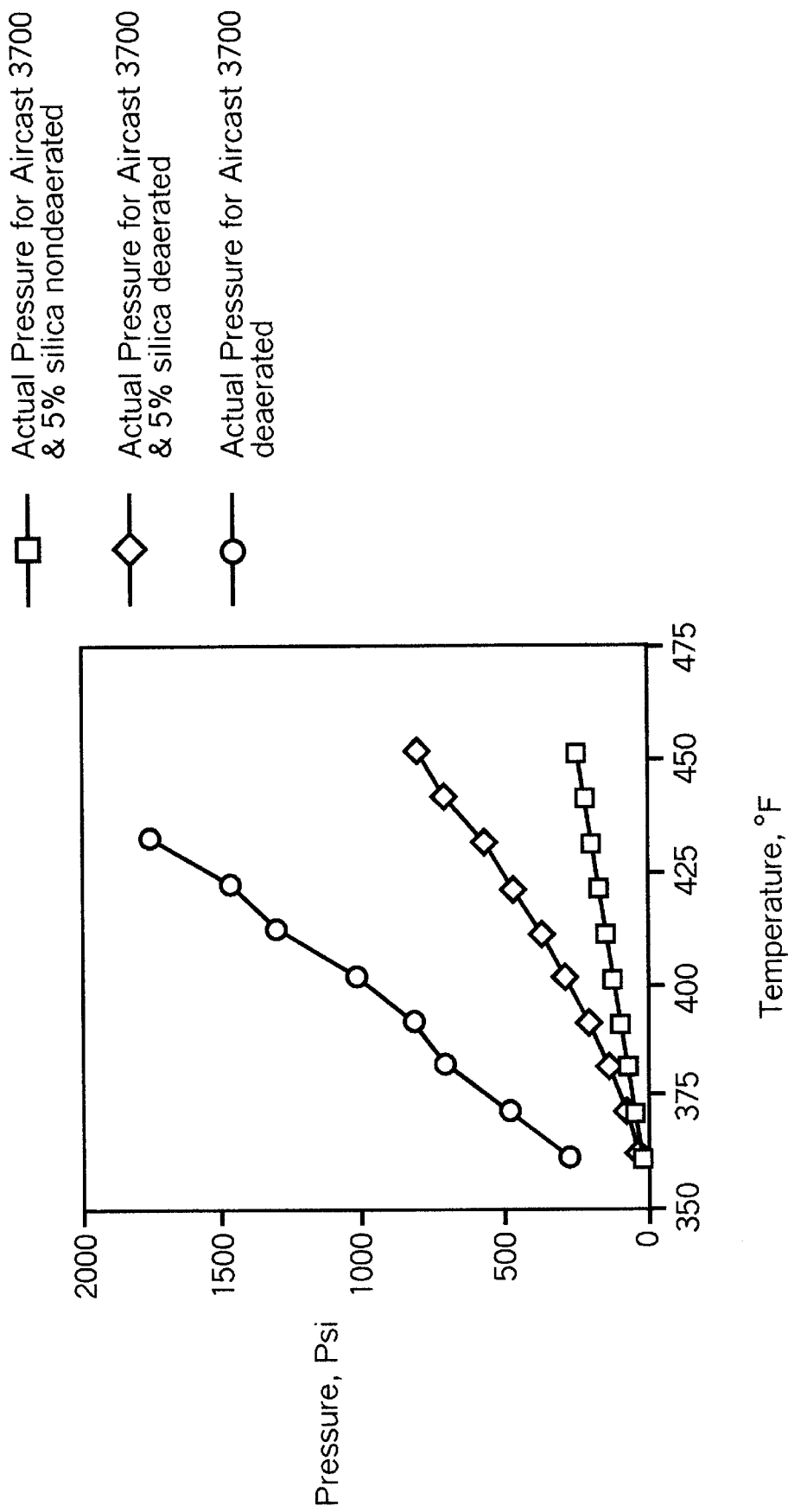

Tests were conducted on a standard high-temperature castable silicone rubber in order to measure how the bulk modulus of the rubber is affected by altering the preparation of the rubber. The bulk modulus is the physical property of the rubber that defines the rate of pressure applied by the rubber to the preform material during thermal expansion. The silicone rubber chosen for the tests was "Aircast 3700®", which is a high-temperature castable silicone rubber manufactured by Airtech International, Inc. of Carson, Calif.

First, in accordance with the manufacturer's directions, the liquid rubber was mixed with a curing agent at a ratio of 10:1. The mixture was then held under a vacuum in order to remove air pockets in the rubber. The rubber mixture was allowed to cure at room temperature for approximately 24 hours and then post cured at 300° F. for 30 minutes.

Next, to determine the bulk modulus of the rubber, the rubber was placed in a heat press with the platens in contact with the rubber. The bulk modulus of the rubber was calculated using a dial micrometer to measure the displacement of the lower platen as force was applied to the rubber. The equation used was:

$$K = FL/A\delta l$$

Where K is the bulk modulus, F is the applied force, L is the length of the rubber, A is the cross-sectional area, and $\delta l$ is the change in length. The bulk modulus of the composition was calculated to be $9.36 \times 10^4$ psi.

The bulk modulus of Aircast 3700® that was determined by the above experiment indicates that small increases in temperature would result in significant rubber expansion as well as a significant increase in the pressure applied to the preform material by the expansion of the rubber. Calibrations indicate that the pressure application rate is approximately 200 psi change in pressure for every 10° F. increase in temperature. This drastic increase in pressure during heating makes it difficult to accurately obtain a desired pressure at a predetermined cure temperature.

In an effort to reduce the bulk modulus of the silicone rubber, experiments were conducted wherein various materials including silica powder, sand, and glass beads were individually added to Aircast 3700® before curing. Although all of these additives were somewhat effective in lowering the bulk modulus of the rubber, silica produced the most favorable results. Quantities of silica powder ranging from about 2% to 8% of the silicone rubber volume were effective in lowering the bulk modulus of the rubber. The addition of silica powder in quantities greater than about 8% of the silicone rubber volume rendered the mixture difficult to stir. A volume equal to about 5% of the silicone rubber volume provided the optimum results.

One experiment involved stirring in about 5% by volume of dry silica powder, and then curing and deaerating the mixture. This preparation resulted in a bulk modulus of $2.73 \times 10^4$ psi which represents a substantial reduction as compared to the $9.36 \times 10^4$ psi of the silicone rubber that was not doped with silica. The substantial reduction in bulk modulus in the deaerated material containing the 5% silica was determined to be due to air voids remaining in the rubber which could not be effectively removed during deaeration because of the presence of silica particles.

Another experiment with the silica doped rubber was conducted wherein the deaeration step was eliminated prior to cure. The addition of the silica particles creates a stream of discrete air voids in their wake during the mixing. By eliminating the deaeration step, the air voids remain within the cured rubber. This experiment resulted in a further reduction in the bulk modulus to $0.928 \times 10^4$ psi. This new preparation according to the present invention lowered the pressure application by the rubber during heating to a very manageable 20 psi change for every 10° F. increase in temperature. As illustrated in FIG. 1, the addition of the silica powder and the elimination of the deaeration step results in significantly lower pressure application when the rubber is heated. This small change in pressure per degree Fahrenheit (20 psi/10° F.) makes it possible to conveniently produce composite parts for a variety of applications.

The following is a non-limiting example of the use of the method according to the present invention to produce graphite/epoxy twisted spar tubes to be used in helicopter rotor blades. Each spar tube is hollow and 24 inches long with a 70-degree twist from one end to the other.

The pressure required for complete consolidation and cure of the spar tubes was calculated to be approximately 125 psi. A modified silicone rubber system was utilized to apply the necessary pressure to the composite part during the molding process.

A silicone rubber composition was prepared in the form of the desired core shape of the spar tubes. The silicone rubber used in this case was Aircast 3700® doped with dry silica powder. In casting the silicone rubber, a 10:1 ratio of 200 grams of rubber to 20 grams of catalyst was used. Dry silica powder was then added, the amount being about 5% by volume of the mixture. The mixture was not deaerated as would normally be done in accordance with the manufacturer's instructions.

In order to obtain the desired pressure application of 125 psi at the cure temperature of the graphite/epoxy composite (350° F.), it was determined that 92% of the mold cavity volume should be filled with cast rubber. That is, 8% void space for free expansion of the rubber prior to contact initiation results in a final pressure of 125 psi. The amount of void space required for free expansion before contact can be determined using the following equations:

$$V_2^{Rubber} = V_1^{Rubber}(1 + \alpha^{Rubber}\Delta T)$$

$$\Delta V_c^{Rubber} = PV_2^{Rubber}/K$$

$V_1^{Rubber}$ = volume of rubber at room temperature
$V_2^{Rubber}$ = volume of rubber at final temperature
$\alpha^{Rubber}$ = the cubic coefficient of thermal expansion
$\Delta T$ = final temperature minus room temperature
P = final pressure after full expansion of the rubber
K = the bulk modulus of the rubber
$\Delta V_c^{Rubber}$ = the decrement of rubber volume necessary to fit the freely expanded rubber into the mold cavity at the final temperature.

In order to prepare the necessary volume of the silicone rubber, the mold cavity was filled with a uniform layer of tape so that only 92% of the cavity was filled with rubber. The rubber mixture was allowed to cure at room temperature for approximately 24 hours and then post cured at 300° F. for 30 minutes.

The preform material was then laid up on the rubber core, the assembly was placed in the rigid mold cavity, and the entire mold setup was heated to the cure temperature of the composite preform material. The thermal expansion of the silicone rubber material during heating caused the preform material to be forced into intimate contact with the mold surface. The pressure exerted by the cast rubber core at the cure temperature of the composite material was maintained for the duration of the two-hour cycle. After the cure cycle was complete and cooling to ambient temperature occurred, the rubber core shrank from the composite part back to its original state. The rubber core was then removed from the fully cured composite spar tube. Due to the accurate control of the pressure application during the curing process, the tubes produced were of good quality manifested by the uniform thickness along all surface walls of the tubes.

In addition to the molding method described above, the technique can be modified to produce parts that are not hollow in structure. Instead of positioning the silicone rubber composition at the core of the preform part, the silicone rubber can be positioned within the mold cavity so that it expands and applies pressure to the outer surfaces of the preform part. Furthermore, the above description pertains to the molding of composite materials in which the process requires precise pressure application at the cure temperature. The identical molding process utilizing silica doped silicone rubber can be employed to mold parts fabricated from various materials.

Another advantage of the modified silicone rubber is the ability to debulk and cure preform materials in one step utilizing the thermal expansion of the silicone rubber. Certain preform materials require significant debulking before final curing because the preform material is many times thicker than the desired thickness of the final part. For instance, powdered towpreg is usually much thicker before debulking due to the bulk acquired when the tow is impregnated with powder particles. Debulking is typically conducted by applying pressure to the preform material thereby inducing the resin flow and fiber movement necessary to eliminate voids and fill the intra- and inter-tow spaces. The thermal expansion of the silicone rubber can provide the pressure necessary to debulk as well as cure preform materials. Prior to heating the mold container to the final cure temperature, the mold container can be maintained at a lower temperature to allow for the silicone rubber to expand and apply the necessary pressure to the preform material so that debulking occurs. Therefore, while the present invention has been disclosed in connection with the preferred embodiment thereof, it should be understood that there may be other embodiments which fall within the spirit and scope of the invention as defined by the following claims.

What is claimed is:

1. A method of molding structural parts, said method comprising:

a) providing a preform material for the structural part;

b) preparing a solid silicone rubber composition having entrained air voids to reduce the bulk modulus of the rubber such that a desired expansion rate of the rubber is obtained during a subsequent heating step, said preparation comprising:
   (1) providing a liquid castable silicone rubber;
   (2) adding a suitable amount of curing agent to the rubber;
   (3) stirring in a sufficient quantity of inert additive to introduce discrete air voids into the rubber such that a desired reduction in the bulk modulus of the rubber is obtained; and
   (4) curing the rubber;

c) positioning the preform material in a rigid mold having the desired shape of the structural part;

d) positioning a sufficient quantity of the silicone rubber in the rigid mold container such that the expansion of the silicone rubber during a subsequent heating will cause the preform material to be forced into intimate contact with the rigid mold container; and e) heating the mold container to cause the silicone rubber to expand and to cure the preform material.

2. The method of molding structural parts as set forth in claim 1, wherein the inert additive is a silica powder.

3. The method of molding structural parts as set forth in claim 2, wherein between about 2% to 8% by volume of the silica powder is added to the liquid silicone rubber.

4. The method of molding structural parts as set forth in claim 2, wherein about 5% by volume of the silica powder is added to the liquid silicone rubber.

5. A method of molding structural parts, said method comprising:

a) providing a preform material for the structural part;

b) preparing a solid silicone rubber composition having entrained air voids to reduce the bulk modulus of the rubber such that a desired expansion rate of the rubber is obtained during a subsequent heating step, said preparation comprising:
   (1) providing a liquid castable silicone rubber;
   (2) adding a suitable amount of curing agent to the rubber;
   (3) stirring in a sufficient quantity of inert additive to introduce discrete air voids into the rubber such that a desired reduction in the bulk modulus of the rubber is obtained; and
   (4) curing the rubber;

c) positioning the preform material in a rigid mold having the desired shape of the structural part;

d) positioning a sufficient quantity of the silicone rubber in the rigid mold container such that the expansion of the silicone rubber during a subsequent heating step will cause the preform material to be forced into intimate contact with the rigid mold container;

e) heating the mold container to cause the rubber to expand and debulk the preform material; and f) heating the mold container to cause the rubber to cure the preform material.

6. The method of molding structural parts as set forth in claim 5, wherein the inert additive is a silica powder.

7. The method of molding structural parts as set forth in claim 6, wherein between about 2% to 8% by volume of the silica powder is added to the liquid silicone rubber.

8. The method of molding structural parts as set forth in claim 6, wherein about 5% by volume of the silica powder is added to the liquid silicone rubber.

* * * * *